(12) United States Patent
Kitabayashi

(10) Patent No.: US 12,102,948 B2
(45) Date of Patent: Oct. 1, 2024

(54) FILTER MEDIUM RECYCLING APPARATUS

(71) Applicant: Daiya CO., LTD, Osaka (JP)

(72) Inventor: Isao Kitabayashi, Osaka (JP)

(73) Assignee: DAIYA CO., LTD, Osaka (JP)

(*) Notice: Subject to any disclaimer, the term of this patent is extended or adjusted under 35 U.S.C. 154(b) by 379 days.

(21) Appl. No.: 17/779,267

(22) PCT Filed: Apr. 17, 2020

(86) PCT No.: PCT/JP2020/016839
§ 371 (c)(1),
(2) Date: May 24, 2022

(87) PCT Pub. No.: WO2021/210154
PCT Pub. Date: Oct. 21, 2021

(65) Prior Publication Data
US 2022/0401864 A1    Dec. 22, 2022

(51) Int. Cl.
 *B01D 41/02*    (2006.01)
 *B08B 3/02*    (2006.01)
 *B08B 13/00*    (2006.01)
(52) U.S. Cl.
 CPC .............. *B01D 41/02* (2013.01); *B08B 3/02* (2013.01); *B08B 13/00* (2013.01); *B08B 2203/027* (2013.01)
(58) Field of Classification Search
 None
 See application file for complete search history.

(56) References Cited

FOREIGN PATENT DOCUMENTS

| JP | 5-253420 | 10/1993 |
|----|----------|---------|
| JP | 7-538 | 1/1995 |
| JP | 10-18406 | 1/1998 |
| JP | 10-220164 | 8/1998 |
| JP | 2007-190523 | 8/2007 |
| JP | 2008-93626 | 4/2008 |
| JP | 2011-140001 | 7/2011 |
| JP | 2011-156512 | 8/2011 |
| JP | 2013-248561 | 12/2013 |

OTHER PUBLICATIONS

JP2009154108 translation, Recycle Apparatus Of Filter Medium Used For Filtering Industrial Waste, Has Cleaning Unit That Is Provided In Downward Direction Of Sieve Cleaning Unit For Spraying Water To Filter Medium, Kitabayashi (Year: 2009).*
JHP05253420A translation, Recycling Device for Filter Medium, Hirohashi (Year: 1993).*
International Search Report mailed Jul. 14, 2020 in International (PCT) Application No. PCT/JP2020/016839.

* cited by examiner

*Primary Examiner* — Cristi J Tate-Sims
(74) *Attorney, Agent, or Firm* — Wenderoth, Lind & Ponack, L.L.P.

(57) ABSTRACT

Dirt adhering to filter media is more effectively removed. A filter medium recycling apparatus 100 of the present invention includes a water storage tank 8, a booster pump 21 for sucking and pressurizing water stored in the water storage tank 8, a classifying section 3 for classifying filter media, a first jet pump 1A that is driven with water pressurized by the booster pump 21 to suck and jet filter media to be recycled and transport the filter media to the classifying section, a showering device 7 for cleaning the filter media classified by the classifying section 3, and a second jet pump 1B for sucking and jetting the filter media cleaned by the showering device 7.

2 Claims, 3 Drawing Sheets

FILTER MEDIUM RECYCLING APPARATUS

TECHNICAL FIELD

The present invention relates to a filter medium recycling apparatus for cleaning and recycling filter media to which dirt has adhered due to use, and particularly relates to a filter medium recycling apparatus using a jet pump to clean filter media.

BACKGROUND ART

There has been known a filter medium recycling apparatus for cleaning filter media used in a percolator, a filter bed or the like by using a jet pump and recycling the filter media.

For example, Patent Literature 1 proposes a filter medium recycling apparatus for cleaning filter media with a water jet caused by an air-mixture jet which sucks air into a negative pressure generating section of a jet pump together with liquid. In this filter medium recycling apparatus, when filter media in a filtering tower are sucked by the air-mixture jet and transported to a classifying section in which filter media are classified according to the sizes thereof, the filter media is cleaned with the water jet caused by the air mixture jet.

However, the filter medium recycling apparatus proposed in Patent Literature 1 has been problematic in that it cannot sufficiently remove dirt when the dirt firmly sticks to the filter media.

Therefore, as shown in FIG. 2, the present inventor has conceived a filter medium recycling apparatus 900 in which a second jet pump 1C is provided between a classifying section 3 and a first jet pump 1A for sucking filter media from a filtering tower X in the filter medium recycling apparatus of Patent Literature 1, whereby the filter media are cleaned with the water jet twice while the filter media are transported from the filtering tower X to the classifying section 3.

CITATION LIST

Patent Literature

Patent Literature 1: Japanese Patent Laid-Open No. 5-253420

SUMMARY OF INVENTION

Technical Problem

However, this filter medium recycling apparatus 900 is problematic in that the amount of water to be transported to the classifying section 3 together with the filter media increases because pressurized water is supplied to the second jet pump 1C as well as the first jet pump 1A, so that dirt such as accretions and the like separated from the filter media overflows together with redundant water from a hopper 31 for classifying filter media of finest particles in the classifying section, and the filter media are mixed into water stored in a water storage tank 8 through redundant water drain pipes 40 and 41.

The present invention has been made in view of the foregoing problem, and has an object to provide a filter medium recycling apparatus in which filter media can be prevented from being mixed into stored water.

Solution to Problem

According to the invention which has been made to achieve the above-mentioned object, a filter medium generating apparatus comprises: a water storage tank; a booster pump for sucking and pressurizing water stored in the water storage tank; a classifying section having a plurality of classifying stages for classifying filter media; a first jet pump that is driven with water pressurized by the booster pump to suck and jet filter media to be recycled, and transport the filter media to the classifying section; a showering device for cleaning the filter media classified by the classifying section; and a second jet pump that is driven by water pressurized by the booster pump to suck and jet the filter media cleaned by the showering device, wherein the plurality of classifying stages each comprise a hopper having a sieve blocking an upper opening, and is arranged side by side in order from a classifying stage including a sieve having finer meshes to a classifying stage including a sieve having coarser meshes so that the upper openings of adjacent classifying stages are in contact with each other, and configured so that a circulating water jet nozzle for jetting circulating water to the filter media is provided above the sieves, supernatant water in the water storage tank is supplied from a pump provided in the water storage tank via a circulating water supply pipe to the circulating water jet nozzle, and redundant water out of water transported into each hopper is drained to the water storage tank via a redundant water discharge pipe, and wherein the showering device comprises a rotary sieve and a fresh water jetting pipe, the rotary sieve includes a filter material introducing port and a filter material discharge pipe that communicate with an inside of the rotary sieve, and is configured so as to introduce the filter media classified in the classifying section from the filter medium introducing port to the inside of the rotary sieve, clean the filter media with fresh water jetted from the fresh water jetting pipe, and then discharge the filter media from the filter media discharge pipe, and the second jet pump is configured to suck and jet the cleaned filter media discharged from the inside of the rotary sieve through the filter material discharge pipe.

As described above, in the filter medium recycling apparatus according to the present invention, the second jet pump provided in addition to the first jet pump is provided on the downstream side of the showering device for cleaning the filter media after the filter media are classified, and cleaning-completed filter media are sucked from the showering device and transported to a recycled filter medium storing section by the second jet pump. Therefore, the pressurized water for driving the second jet pump is not transported to the classifying section, and it is possible to suppress overflowing of filter media and dirt from the hoppers of the classifying section.

It is preferable that the filter medium recycling apparatus of the present invention further comprises a recycled filter medium storing section for storing filter media jetted from the second jet pump, and the recycled filter medium storing section comprises a water-permeable filter medium storing bag for storing filter media, a permeated water tank which accommodates the filter medium storing bag and stores water permeating through the filter medium storing bag, and a return pump for returning water in the permeated water tank to the water storage tank. The above-mentioned configuration makes it possible to return the water used for cleaning of the filter media to the water storage section for reuse.

Here, "jet pump" is defined as a pump which sucks, cleans and transports solid material, liquid material or gas material from the outside by negative pressure generated by reducing the diameter of a flow path for pressurized water.

Advantageous Effects of the Invention

As described above, according to the filter medium recycling apparatus of the present invention, it is possible to suppress mixing of filter media and dirt peeled from the filter media into stored water, so that the dirt peeled off the filter media by the first jet pump can be prevented from hindering cleaning by the second jet pump.

DESCRIPTION OF EMBODIMENTS

Figure 1:
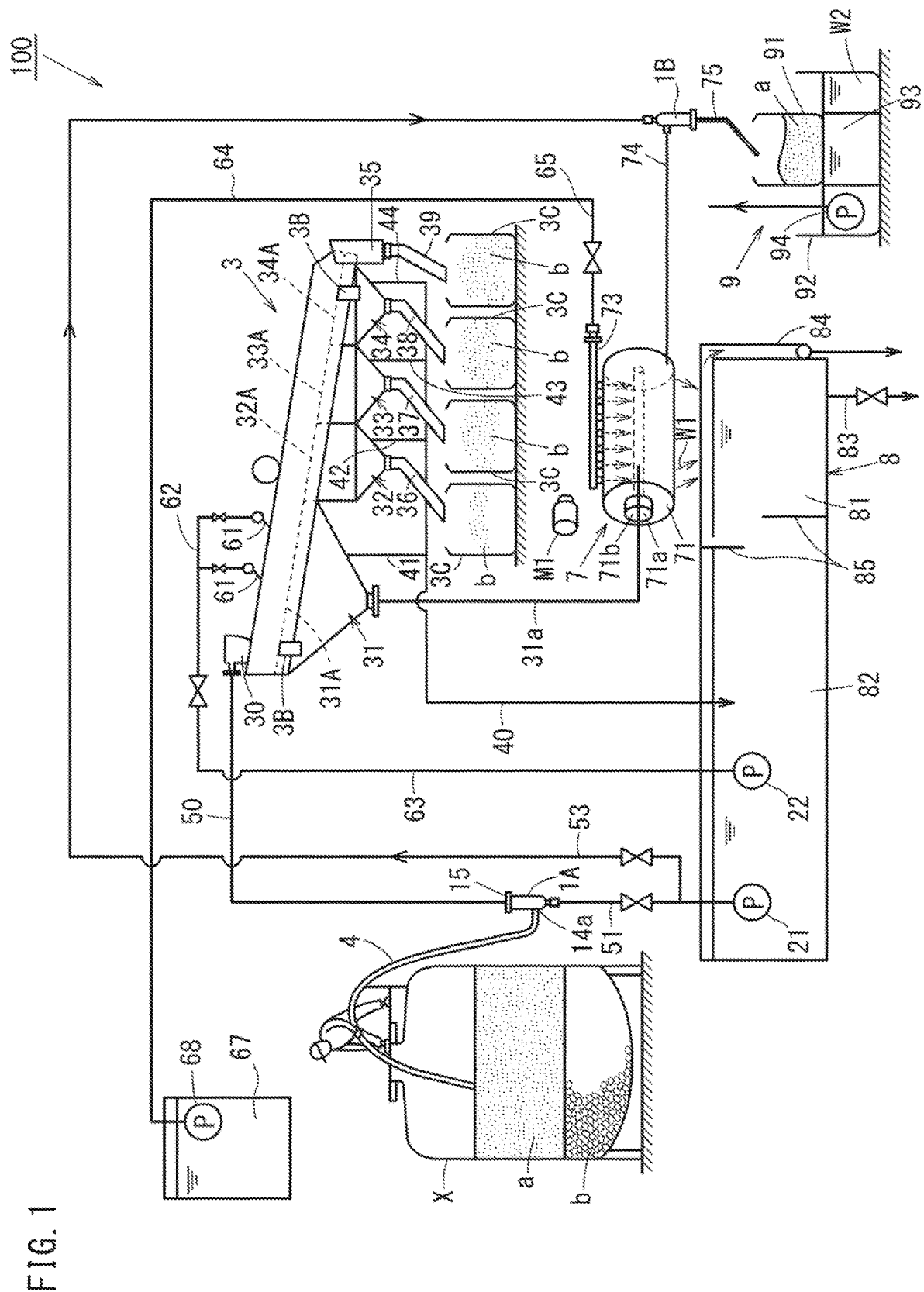
FIG. 1 is a schematic diagram showing a filter medium recycling apparatus according to an embodiment of the present invention.
Figure 2:
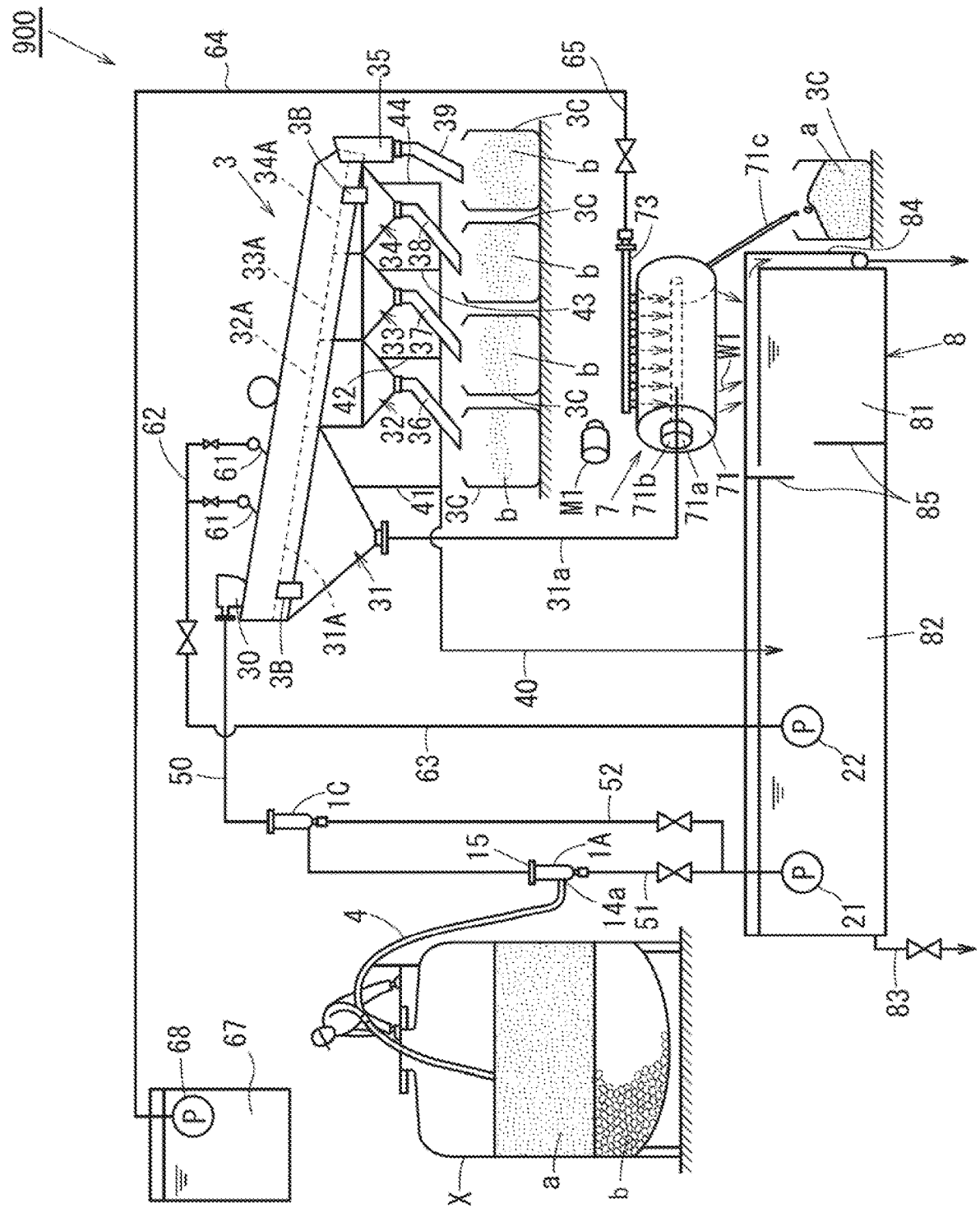
FIG. 2 is a schematic diagram showing a filter medium recycling apparatus that the present inventor has previously conceived.

An embodiment of the present invention will be described hereunder in detail with reference to the drawings. FIG. 1 shows a filter medium recycling apparatus 100 according to a first embodiment of the present invention. As shown in FIG. 1, the filter medium recycling apparatus 100 mainly includes a first jet pump 1A, a second jet pump 1B, a booster pump 21, a classifying section 3, a showering device 7, a water storage tank 8, and a recycled filter medium storing section 9. This configuration allows the filter medium recycling apparatus 100 to suck and discharge filter media containing filter material a and filter gravel b in a filtering tower X, separate the filter material a and the filter gravel b from each other, classify the filter gravel b according to the particle size, and peel off dirt sticking or adhering to the filter material a to clean the filter material a, so that the filter material a is recycled. Note that the filter material a includes anthracite, manganese zeolite, filter sand or the like which plays a major part in a filtering action, and the filter gravel b is gravel which forms a layer for supporting the filter material a.

Figure 3:
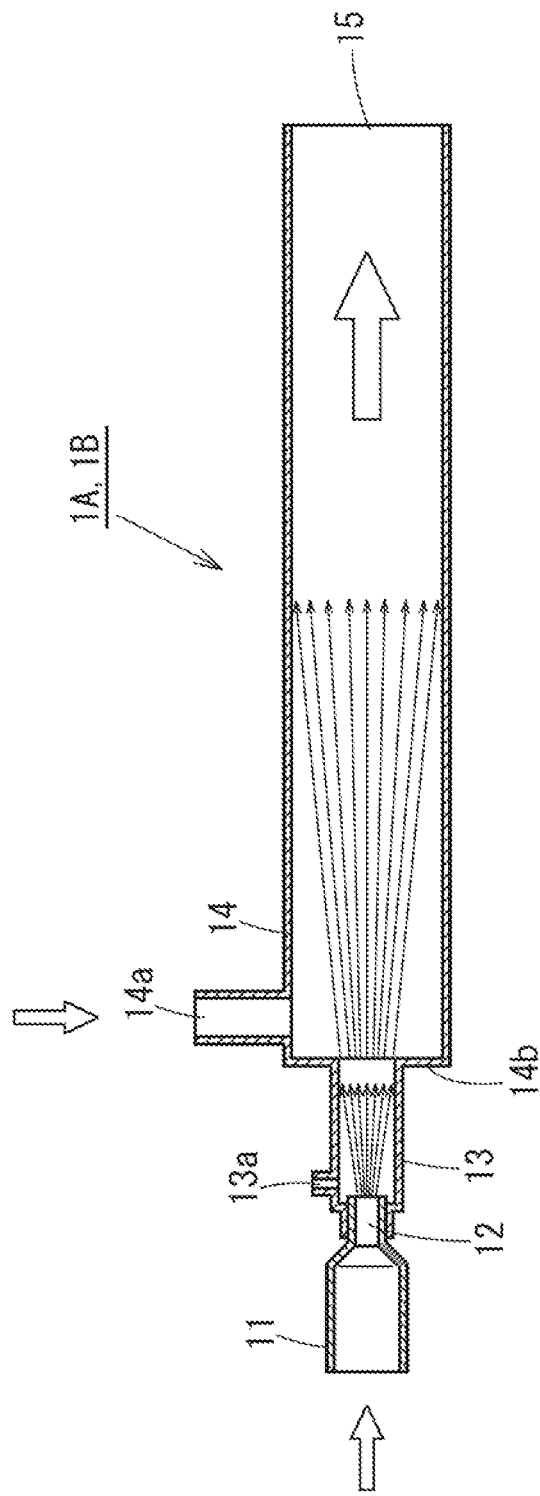
FIG. 3 is a longitudinally-sectional view of a jet pump shown in FIG. 1.

As shown in FIG. 3, each of the first and second jet pumps 1A and 1B includes a pressurized water introducing pipe 11 for introducing pressurized water, a jet nozzle 12 provided by reducing the diameter of the tip of the pressurized water introducing pipe 11, an air mixture pipe 13 which is continuous to a downstream side of the jet nozzle 12 (right side in FIG. 3) and has an inner diameter slightly larger than that of the jet nozzle 12, and a negative pressure generating pipe 14 which is continuous to a downstream side of the air mixture pipe 13 and has a larger diameter than the air mixture pipe 13.

The air mixture pipe 13 has an intake port 13a that opens through a pipe wall, and the negative pressure generating pipe 14 has a suction port 14a that opens through a pipe wall near a bottom portion 14b.

As shown in FIG. 1, the pressurized water introducing pipe 11 of the first jet pump 1A communicates with the booster pump 21, and a rear-end opening 15 communicates with a filter media casting port 30 of the classifying section 3 through a filter media transporting pipe 50. A pressurized water introducing pipe 11 of the second jet pump 1B also communicates with the booster pump 21, and a rear-end opening 15 communicates with the recycled filter medium storing section 9 via a discharge pipe 75.

In other words, the first and second jet pumps 1A and 1B are both driven by the booster pump 21. The booster pump 21 pressurizes the stored water in the water storage tank 8 and introduces the stored water into the pressurized water introducing pipes 11 of the first and second jet pumps 1A and 1B. The pressurized water introduced into the pressurized water introducing pipe 11 forms a jet stream through the jet nozzle 12 having a diameter smaller than that of the pressurized water introducing pipe 11, and jetted to the air mixture pipe 13 while depressurized, which causes negative pressure in the air mixture pipe 13 and the negative pressure generating pipe 14. As a result, the negative pressure generated in the air mixture pipe 13 sucks the air in the atmosphere from the intake port 13a into the air mixture pipe 13, and the jet stream described above is surrounded by this air, so that the high speed at the jetting time can be maintained. Further, the negative pressure generated in the negative pressure generating pipe 14 sucks the filter media of the filtering tower X from the suction port 14a.

The classifying section 3 includes a plurality of (five in an illustrated example) hoppers 31, 32, 33, 34, and 35. The hoppers 31, 32, 33, and 34 have sieves 31A, 32A, 33A, and 34A that block the upper openings of the hoppers 31, 32, 33 and 34, respectively. The sieves 31A, 32A, 33A, and 34A are arranged in order from a sieve of smaller (finer) meshes to a sieve of larger (coarser) meshes. The sieves 31A, 32A, 33A, and 34A are configured to be integrally vibrated by a vibrators 3B to classify the filter media casted from the filter media casting port 30 into the hoppers 31, 32, 33, 34 and 35 in order from a filter medium having a smaller particle size while feeding the filter media toward a sieve having a larger mesh size on the rear side. The sieves 31A, 32A, 33A, and 34A are not particularly limited, but stainless steel sieves are preferably used. With respect to the size of the filter medium to be classified through each hopper, for example, the filter material a having an effective diameter of about 0.6 mm is classified in the hopper 31, and the filter gravel b having particle sizes of about 3 to 25 mm is classified in the hoppers 32, 33, 34 and 35.

Further, circulating water jet nozzles 61 for jetting circulating water to the filter material a are provided above the sieve 31A. Supernatant water in the water storage tank 8 is circulated and supplied to the circulating water jet nozzles 61 from a pump 22 provided in the water storage tank 8 via circulating water supply pipes 62 and 63.

The lower end of the hopper 31 is connected to the showering device 7 via a filter material transporting pipe 31a, and the lower ends of the hoppers 32, 33, 34, and 35 are provided with discharge pipes 36, 37, 38, and 39 for discharging the classified filter media.

The showering device 7 includes a rotary sieve 71 and a fresh water jetting pipe 73. The rotary sieve 71 is configured by blocking both ends of a cylindrical stainless steel sieve arranged axially horizontally, and is provided with a rotary shaft 71a and a filter material introducing port 71b on an end face of one end side (left side in FIG. 1). A filter material discharge pipe 74 is provided on an end face of the other end side. The fresh water jetting pipe 73 is provided so as to extend in the axial direction of the rotary sieve along the outer peripheral surface of the rotary sieve 71, and jets fresh water onto the rotary sieve 71 to wash away clogging of the rotary sieve 71 and sludge inside the rotary sieve 71. Fresh water is supplied from the fresh water storage tank 67 to the fresh water jetting pipe 73 via fresh water supply pipes 64 and 65 by a pump 68. The rotary sieve 71 is rotated through a transmission belt (not shown) and the rotary shaft 71a by a motor Ml.

The showering device 7 is provided above the water storage tank 8, and dirt separated from the filter material a which is introduced from the filter material introducing port 71b is permeated downward as muddy water W1 and discharged to a muddy water tank 81 of the water storage tank 8 by the showering device 7. In order to remove finally cleaned deposits, the cleaned filter material a is fed from the filter material discharge pipe 74 to the second jet pump 1B to clean the filter material a.

The water storage tank 8 is partitioned, by a partition wall 85, into a muddy water tank 81 for storing muddy water discharged from the showering device 7 and a supernatant water tank 82 for storing supernatant water of the muddy water tank 81. Reference numerals 83 and 84 in the figures designate a drain portion and an overflow portion, respectively.

The recycled filter medium storing section 9 includes a water-permeable container bag 91 for storing the filter material a discharged from the second jet pump 1B, a mount table 93 for the container bag 91, and a permeated water tank 92 which accommodates the container bag 91 and the mount table 93 therein and retains permeated water W2 permeating through the container bag 91.

Next, a method for operating the filter medium recycling apparatus 100 according to the present embodiment, and the actions and effects of the respective sections will be described.

When the filter media (filter material a and filter gravel b) are recycled by using the filter medium recycling apparatus 100, the booster pump 21 is first driven to introduce pressurized water into the pressurized water introducing pipe 11 of the first jet pump 1A in a state where a filter medium suction hose 4 is inserted among the filter media of the filtering tower X.

At this time, the first jet pump 1A sucks the filter media from the suction port 14a by the above-mentioned action, and transports the filter media to the classifying section 3 via the filter media transporting pipe 50 while cleaning the filter media with a jet stream.

The filter media transported to the classifying section 3 are rolled on the sieves 31A, 32A, 33A and 34A while cleaned with circulating water jetted from the circulating water jet nozzles 61. Then, the filter material a is classified into the hopper 31, and the filter gravel b is successively classified into the hoppers 32, 33, 34, and 35 in increasing order in particle size. The filter gravel b classified into the hoppers 32, 33, 34, and 35 is stored in the container bags 3C via the discharge pipes 36, 37, 38, and 39, respectively.

The filter material a classified into the hopper 31 is passed through the filter material transporting pipe 31a, casted from the filter material introducing port 71b of the showering device 7 into the rotary sieve 71 and cleaned with jet water from the fresh water jetting pipe 73, thereby separating sludge adhering to the filter material and filter material having unnecessary particle sizes smaller than the sieve mesh size. The muddy water W1 containing the separated sludge passes through the rotary sieve 71, and is discharged to the muddy water tank 81. At this time, the clogging of the rotary sieve 71 is cleaned by the fresh water jetting pipe 73.

Here, the pressurized water is also supplied from the booster pump 21 to the pressurized water supply pipe 53 to drive the second jet pump 1B. As a result, the cleaned filter material a in the rotary sieve 71 is sucked into the second jet pump 1B through the filter material discharge pipe 74, and discharged to the container bag 91 through the discharge pipe 75 while cleaned with a jet stream. The water discharged together with the filter material a is retained in the permeated water tank 92, and returned to the muddy water tank 81 by a pump 94. The recycled filter material a is returned to the filtering tower X for reuse.

In the filter medium recycling apparatus 100 of the present embodiment, the filter material a is cleaned by the showering device 7 to separate sludge, and then cleaned again by the second jet pump, so that dirt sticking to the filter material a can be further removed.

Since driving water for the second jet pump does not pass through the classifying section 3, the filter material a and the gravel overflowing from the classifying section 3 do not get mixed into the water storage tank 8.

The filter medium recycling apparatus of the present invention is not limited to the above-described embodiment, and for example, the jet pump may not have any intake port. The recycled filter medium storing section does not have any pump for returning waste water. The number of hoppers in the classifying section may be 4 or less, or 6 or more.

REFERENCE SIGNS LIST

First jet pump 1A
Second jet pump 2A
Booster pump 21
Classifying section 3
Hopper (classifying stage) 31, 32, 33, 34
Showering device 7
Water storage tank 8
Recycled filter medium storing section 9
Filter medium storage bag (container bag) 91
Permeated water tank 92
Return pump 94

The invention claimed is:

1. A filter medium recycling apparatus comprising:
a water storage tank;
a booster pump for sucking and pressurizing water stored in the water storage tank;
a classifying section having a plurality of classifying stages for classifying filter media;
a first jet pump that is driven with water pressurized by the booster pump to suck and jet filter media to be recycled and transport the filter media to the classifying section;
a showering device for cleaning the filter media classified by the classifying section; and
a second jet pump that is driven by water pressurized by the booster pump to suck and jet the filter media cleaned by the showering device,
wherein the plurality of classifying stages each comprise a hopper having a sieve which blocks an upper opening of the hopper, and are arranged side by side in order from a classifying stage including a sieve having finer meshes to a classifying stage including a sieve having coarser meshes so that the upper openings of adjacent classifying stages are in contact with each other, and configured so that a circulating water jet nozzle for jetting circulating water to the filter media is provided above the sieves, supernatant water in the water storage tank is supplied from a pump provided in the water storage tank via a circulating water supply pipe to the circulating water jet nozzle, and redundant water out of water transported into each hopper is drained to the water storage tank via a redundant water discharge pipe, and
wherein the showering device comprises a rotary sieve and a fresh water jetting pipe, the rotary sieve includes a filter material introducing port and a filter material discharge pipe that communicate with an inside of the rotary sieve, and is configured so as to introduce the filter media classified in the classifying section from the filter medium introducing port to the inside thereof, clean the filter media with fresh water jetted from the fresh water jetting pipe, and then discharge the filter media from the filter media discharge pipe, and the second jet pump is configured to suck and jet the cleaned filter media discharged from the inside of the rotary sieve through the filter material discharge pipe.

2. The filter medium recycling apparatus according to claim 1, further comprising a recycled filter medium storing section for storing filter media jetted from the second jet pump, and the recycled filter medium storing section includes a water-permeable filter medium storing bag for storing filter media, a permeated water tank which accommodates the filter medium storing bag and stores water permeating through the filter medium storing bag, and a return pump for returning water in the permeated water tank to the water storage tank.

* * * * *